Figure 1:
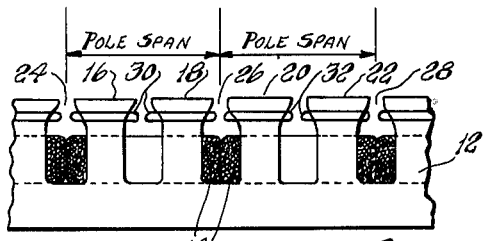

Jan. 18, 1966  L. PELLECCHIA  3,230,487
DIFFERENTIAL COILS TO OPPOSE POLAR FLUX ASYMMETRY
IN SYNCHRO AND RESOLVER TRANSMITTERS
Filed April 25, 1963

SINGLE TURN COIL VERSION

MULTI-TURN COIL VERSION

INVENTOR.
LOUIS PELLECCHIA
BY Arthur S. Bowers
AGENT.
Max N. Farmer
ATTORNEY.

**3,230,487**
DIFFERENTIAL COILS TO OPPOSE POLAR FLUX ASYMMETRY IN SYNCHRO AND RESOLVER TRANSMITTERS
Louis Pellecchia, Brooklyn, N.Y., assignor to the United States of America as represented by the Secretary of the Navy
Filed Apr. 25, 1963, Ser. No. 276,138
1 Claim. (Cl. 336—73)
(Granted under Title 35, U.S. Code (1952), sec. 266)

The invention described herein may be manufactured and used by or for the Government of the United States of America for governmental purposes without the payment of any royalties thereon or therefor.

This invention relates to induction type transmitters employed in position telemetering systems, such as synchros, resolvers and other inductive devices having a primary and a secondary assembly, relatively movable, wherein if the primary is energized by a sinusoidal source, the amplitude and polar phase relationship of the voltages induced in the secondary relative to the primary are a function of the relative orientation of the primary and secondary assemblies.

Angular position telemetering systems include a transmitter and a receiver and in some systems a differential device between transmitter and receiver for adding to the signal from transmitter to receiver additional position information. Each of these induction devices include a coaxial rotor and stator, one of which is the primary and the other the secondary. The receiver is servoed continuously to orient the rotor in the stator for minimum output voltage from the receiver secondary. The transmitter and receiver rotors each have a zero or reference position in their respective stators. During operation of a position telemetering system that is perfect, the receiver rotor tracks the transmitter rotor so that the angular displacements of the rotors from their reference positions are equal at all times whether the transmitter rotor is turned continuously or in steps. If the system includes a differential device its function is to add algebraically to the angular displacement of the transmitter rotor another displacement so that the receiver rotor is angularly displaced out of its reference position the algebraic sum of two angular displacements. In operating the system, the primary of the transmitter is energized with continuous sinusoidal voltage of selected amplitude and frequency. If the transmitter is perfect, the effective valves of the voltages induced in the secondary vary sinusoidally with rotation, e.g., free of harmonics. The voltages induced in the secondary are coupled to the primary of the differential device. If the differential device is perfect, the effective valves of the voltages induced in the secondary are similar to those applied to the primary, except for amplitude and polarity phase relationships. In other words, no harmonic distortion is introduced. Similarly, the voltages from the secondary of the differential device are applied to the primary of the receiver. If the receiver device is perfect, the effective valve of the voltage induced in the secondary varies also sinusoidally with rotation, i.e., no harmonic distortion introduced by the receiver. The output of the receiver is power amplified and coupled to a servomotor which rotates the receiver rotor to reduce the output signal of the receiver to the minimum or null level. In an ideal system, the harmonic distortion of voltage outputs anywhere in the system is negligible or zero and the null level of the output signal is zero. The accuracy of the system is reduced as harmonic distortion is introduced anywhere in the system and the servo accuracy also is reduced as the null level of the output signal is increased.

Position telemetering systems commonly employ synchro devices, i.e., synchro transmitters, synchro differential generators and synchro receivers. In a synchro transmitter, the rotor is generally the primary and includes a two-terminal winding which is assembled on the rotor to define, when energized, at least one pair of poles symmetrical about the axis of the rotor. The poles are of salient or non-salient construction. In a two pole rotor, the rotor field winding produces opposite polarities in the two poles; in a rotor having several pairs of poles, the rotor field winding produces opposite polarities in successive or adjacent poles. The polar span and polar shape are designed to produce a closely sinusoidal distribution of flux density in the air gap between rotor and stator, in the circumferential direction. In a control transformer or receiver, the primary and secondary include more turns of smaller wire than the transmitter and have comparatively higher impedance than the transmitter. The rotor is the secondary and its lamination stack periphery is as perfectly cylindrical as possible. The stator generally is the primary and is wound with three symmetrically distributed windings to define a plurality of pairs of poles symmetrical about the axis. The wound stator produces essentially sinusoidal flux distribution in the air gap between rotor and stator.

A synchro transmitter is a rotatable transformer. When the primary is energized with a sinusoidal voltage, the synchro produces a set of three secondary voltages of relative magnitudes and polarities that identify the mechanical position angle of the transmitter rotor. Thus, the synchro transmitter is a converter of mechanical angles into equivalent electrical angles. The synchro control transformer or CT receives the set of three voltages from the transmitter and induces a secondary voltage which is nulled by a servo that is connected to turn the CT rotor to match the position angle of the transmitter. Thus, the CT converts the transmitter voltages to the mechanical position angle of the transmitter rotor. With the transmitter synchro and CT electrically connected, and the system energized, the servo will drive the CT rotor to substantially duplicate the transmitter position angle with some angular error. Part of this error is introduced by imperfect electromechanical conversion in the transmitter and CT. In the synchro differential device, the stator is the primary. Stator and rotor are wound with three symmetrically distributed windings. The stator windings define a plurality of pairs of poles symmetrical about the axis. Ideally, in all synchro devices, the rotor and stator are coaxial. Neither rotor nor stator has out-of-roundness. The magnetic material is homogeneous. The structure is symmetrical and the flux distribution in the circumferential direction in the air gap sinusoidal. Synchro devices depart in various degrees from the ideal. These departures introduce harmonic distortion and cause the null level of output voltage to be higher than it would be otherwise and consequently introduce error into the system.

An object of this invention is to increase the accuracy of position telemetering induction devices, e.g., synchros, resolvers and the like having one pair or multipairs of poles, and systems including such devices.

A further object is to reduce harmonic distortion in such deviecs and to reduce null level of the system output voltage to increase accuracy of the system.

A further object is to improve symmetry of the polar flux distribution.

A further object is to reduce disturbance of the polar flux distribution by the translation of the secondary slots under the primary poles.

Other objects and advantages will appear from the following description of an example of the invention, and the novel features will be particularly pointed out in the appended claim.

Figure 2A:
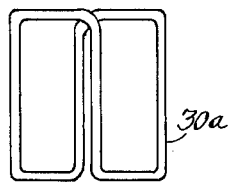
Figure 2B:
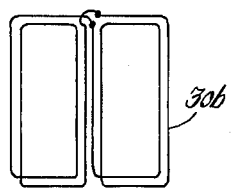
Figure 3:
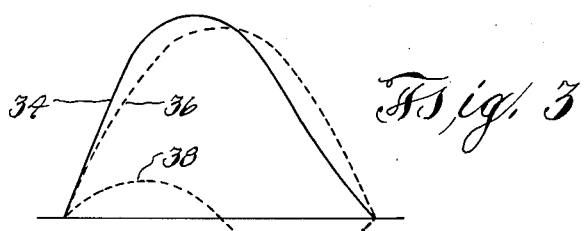
Figure 4:
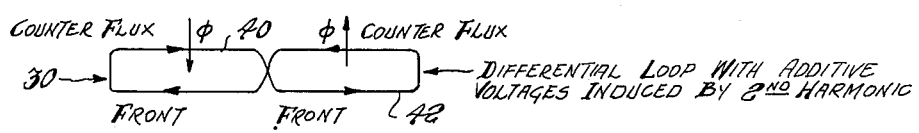

FIG. 1 is a developed end view of a fragment of rotor or stator of an induction type device including this invention thereon, FIGS. 2a and 2b are plan views of two alternative embodiments of differential two-loop cross-connected shorted coils either of which may be included in FIG. 1, FIG. 3 shows an asymmetrical spatial polar flux distribution resolved into the fundamental component and an error inducing second harmonic, the other less severe harmonics being omitted, and FIG. 4 illustrates the effect of the differential loop coil on an asymmetrical flux distribution.

In its broader aspects, this invention concerns opposing asymmetry in the air gap flux density distribution in the circumferential direction relative to a longitudinal bisector of each pole. Asymmetry is opposed with at least one differential coil which is a two-loop cross-connected shorted coil on each pole, transverse to the polar flux with the two loops in mirror image relationship about the longitudinal bisector of the pole. More than one differential coil may be employed on each pole, to obtain more effective rejection of the second harmonic of flux distribution and also to oppose higher harmonics. Where a plurality of coils are applied to each pole, they differ in area, configuration or both.

In FIG. 1, there is shown a fragment 12 of the primary of an induction device of the type described. The fragment 12 may be part of a rotor or stator, e.g., the rotor of a synchro transmitter for energization in unison by a single phase sinusoidal power supply. The windings 14 are the conventional windings in such device. Four teeth 16, 18, 20, 22 are shown; for simplicity of description, the winding 14 is such that two teeth define one pole. One pole extends circumferentially from the center of slot 24 to the center of slot 26 and another pole extends from the center of slot 26 to the center of slot 28. Differential loop coils 30 and 32, one of which is shown in FIG. 2 in either of two versions, are assembled on teeth 16 and 18, and on teeth 20 and 22 respectively. While the coil is illustrated as continuous, i.e., no ends, the free ends of each coil are tied together. The conductor size of the coil is larger than the conductor size in the windings 14. The two cross-connected substantially identical loops of each coil are assembled transverse to the pole and are in mirror image relationship about the longitudinal center of the pole whether the teeth are skewed or parallel to the axis. If the teeth are skewed, the differential loop coil has the same skew.

In FIG. 3, there is illustrated a curve 34 representing an assumed circumferential flux distribution in the air gap under a pole at a particular instant. The flux distribution is asymmetrical about the longitudinal center of the pole. The sinusoidal curves 36 and 38 represent the fundamental and second harmonic components of the spatial flux distribution curve 34. Independent of spatial distribution, the flux density at every point changes sinusoidally as a function of time.

The fundamental 36 and all odd harmonics, not shown, of the asymmetric flux distribution is not influenced by the differential loop coil because the voltages induced thereby in the coil loops are equal and opposite. However, the second harmonic component of the flux distribution 34 induces additive voltages in the two loops. As illustrated in FIG. 4, current flows in the differential coil in a direction to produce flux in opposition to the even harmonic components of the spatial flux distribution. Though the asymmetry of the flux distribution varies with rotation of the rotor, the action of the differential coil in opposing asymmetry is continuous. The effect of the differential loop coil is to reduce asymmetry of polar flux distribution under each pole. It is effective also in reducing time phase asymmetry of the flux it interlinks.

Comparative tests carried out with the differential loops open-circuited and closed-circuited have demonstrated a reduction of null voltage by approximately one-third, and a substantial increase in accuracy.

If instead of non-salient poles as in FIG. 1, the device, e.g., the synchro rotor has salient poles, the pole face can be formed with recesses for nesting the differential coil. The differential coil can be applied where the salient or non-salient poles have either a center slot or pairs of slots symmetrical about the polar center.

In FIG. 1, there are two teeth to a pole. Regardless of the number of teeth per pole, the differential coil is assembled symmetrically as in FIGS. 1 and 2. More than one differential coil can be assembled on one pole if there are sufficient slots. For example, if a pole span includes four teeth, e.g., 16, 18, 20, and 22, the loops of one differential coil may encircle teeth 16 and 22 respectively, while the loops of another differential coil may encircle teeth 18 and 20 respectively, and while the loops of still another differential coil may encircle teeth 16 and 18 and teeth 20 and 22 respectively.

This invention is markedly effective, e.g., on all rotatable induction transmitters including salient and non-salient two-pole and multipolar synchros and resolvers. It is particularly advantageous on two-pole synchro transmitters and resolvers in reducing errors caused by axial eccentricity between rotor and stator and by out-of-roundness of stator or rotor lamination stacks.

This invention is independent of other expedients named below for attenuating and minimizing other harmonic components. The three distributed secondary windings are connected as a balanced Y to attenuate the third harmonic component and its odd multiples. The slot harmonics are minimized by opposed skew of rotor and stator lamination stacks. Some odd harmonics are minimized by choice of polar span. Some harmonics in the output of the transmitter are of such relative magnitudes and algebraic signs as to be subtractive in the control transformer.

It will be understood that various changes in the details, materials and arrangements of parts (and steps), which have been herein described and illustrated in order to explain the nature of the invention, may be made by those skilled in the art within the principle and scope of the invention as expressed in the appended claim.

I claim:

A magnetic structure comprising:
a magnetic core having a plurality of consecutive poles each of which includes an even number of teeth and only one surrounding energizing coil,
each of said poles being symmetrical about a bisector plane along the longitudinal axis of the pole, and
only one shorted coil on each pole and transverse thereto, each shorted coil including two substantially identical parts symmetrical relative to the bisector of the respective pole, the two coil parts being cross-connected whereby current induced in the shorted coil flows in opposite directions in the two coil parts relative to the pole.

References Cited by the Examiner

UNITED STATES PATENTS

| | | | |
|---|---|---|---|
| 767,787 | 8/1904 | Whitney | 310—183 X |
| 2,761,082 | 8/1956 | Chang | 310—166 X |
| 3,030,595 | 4/1962 | Campbell et al. | 336—30 |
| 3,041,486 | 6/1962 | Moffitt | 336—135 X |
| 3,062,993 | 11/1962 | Siemmerbin et al. | 336—135 X |
| 3,128,044 | 4/1964 | Packard | 336—135 |

ROBERT K. SCHAEFER, *Primary Examiner.*

JOHN F. BURNS, *Examiner.*

T. J. KOZMA, *Assistant Examiner.*